(12) United States Patent
Ilbery et al.

(10) Patent No.: US 7,085,002 B2
(45) Date of Patent: Aug. 1, 2006

(54) DEFECTIVE NOZZLE COMPENSATION

(75) Inventors: Peter William Mitchell Ilbery, Dundas (AU); Noribumi Koitabashi, Yokohama (JP); Shoji Kanemura, Sagamura (JP); James Robert Metcalfe, Killara NSW (AU)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 09/859,437

(22) Filed: May 18, 2001

(65) Prior Publication Data

US 2002/0051144 A1 May 2, 2002

(30) Foreign Application Priority Data

May 22, 2000 (AU) .................................... PQ7663

(51) Int. Cl.
*G06K 15/10* (2006.01)
(52) U.S. Cl. ...................... 358/1.8; 358/1.8; 358/3.09; 358/3.1; 358/3.11; 358/3.12; 347/13; 347/14; 347/15; 347/74; 347/75; 347/76; 347/77
(58) Field of Classification Search .............. 358/3.09, 358/3.1, 3.11, 3.12, 1.18; 347/13, 14, 15
See application file for complete search history.

(56) References Cited

U.S. PATENT DOCUMENTS

| | | | | |
|---|---|---|---|---|
| 4,963,882 A | * | 10/1990 | Hickman .................... | 347/41 |
| 5,038,208 A | * | 8/1991 | Ichikawa et al. ........... | 358/502 |
| 5,418,626 A | * | 5/1995 | Semasa ...................... | 358/451 |
| 5,808,637 A | | 9/1998 | Wenzel et al. .............. | 347/53 |
| 5,923,346 A | | 7/1999 | Mills et al. .................. | 347/11 |
| 5,929,875 A | | 7/1999 | Su et al. ..................... | 347/19 |
| 5,992,962 A | * | 11/1999 | Yen et al. .................... | 347/9 |
| 6,010,205 A | * | 1/2000 | Billet .......................... | 347/40 |
| 6,033,054 A | | 3/2000 | Takagi ........................ | 347/43 |
| 6,034,782 A | * | 3/2000 | Hines ......................... | 358/1.14 |
| 6,036,300 A | * | 3/2000 | Suzuki et al. ............... | 347/41 |
| 6,106,093 A | | 8/2000 | Nagoshi ...................... | 347/15 |
| 6,270,187 B1 | * | 8/2001 | Murcia et al. ............... | 347/43 |

FOREIGN PATENT DOCUMENTS

| | | |
|---|---|---|
| EP | 0 664 643 A2 | 7/1995 |
| EP | 0 730 367 A1 | 9/1996 |
| EP | 0 781 034 A2 | 6/1997 |
| EP | 0664643 | 4/2000 |
| EP | 1157840 | 1/2002 |
| EP | 01 30 4451 | 4/2003 |

* cited by examiner

*Primary Examiner*—Edward Coles
*Assistant Examiner*—Yixing Qin
(74) *Attorney, Agent, or Firm*—Fitzpatrick, Cella, Harper & Scinto

(57) ABSTRACT

An image recording apparatus (2000) is disclosed, which comprises forming elements (2002) for forming an image, a memory (2006) indicating relative desirability of utilising the forming elements (2002) for forming the image, and processing means (2008) for computing image recording signals using input image signals (2012) and the stored data. The use of a particular forming element is thereby biased dependent upon the relative desirability data of other forming elements, the corresponding input signal for the particular forming element, and a term for the particular forming element.

3 Claims, 15 Drawing Sheets

| Table Index Value | Combined Pixel Input | Errors distributed to neighbouring pixels | | | | Halftone output | |
|---|---|---|---|---|---|---|---|
| | | e0 | e1 | e2 | e3 | bit 0 | bit 1 |
| 0 | 0 | 0 | 0 | 0 | 0 | 0 | 0 |
| 1 | 1 | 129 | 70 | 37 | 20 | 0 | 0 |
| .. | .. | .. | .. | .. | .. | .. | .. |
| 64 | 64 | 8256 | 4480 | 2368 | 1280 | 0 | 0 |
| 65 | 128-63 | -8127 | -4410 | -2231 | -1260 | 1 | 0 |
| .. | .. | .. | .. | .. | .. | .. | .. |
| 127 | 128-1 | -129 | -70 | -37 | -20 | 1 | 0 |
| 128 | 128 | 0 | 0 | 0 | 0 | 1 | 0 |
| 129 | 128+1 | 129 | 70 | 37 | 20 | 1 | 0 |
| .. | .. | .. | .. | .. | .. | .. | .. |
| 159 | 128+31 | 3999 | 2170 | 1147 | 620 | 1 | 0 |
| 160 | 191-31 | -3999 | -2170 | -1147 | -620 | 0 | 1 |
| .. | .. | .. | .. | .. | .. | .. | .. |
| 190 | 191-1 | -129 | -70 | -37 | -20 | 0 | 1 |
| 191 | 191 | 0 | 0 | 0 | 0 | 0 | 1 |
| 192 | 191+1 | 129 | 70 | 37 | 20 | 0 | 1 |
| .. | .. | .. | .. | .. | .. | .. | .. |
| 255 | 191+64 | 8256 | 4480 | 2368 | 1280 | 0 | 1 |
| .. | .. | .. | .. | .. | .. | .. | .. |
| 319 | 255+64 | 8256 | 4480 | 2368 | 1280 | 0 | 1 |
| 320 | | | | | | | |
| .. | .. | .. | .. | .. | .. | | |
| 448 | | | | | | | |
| 449 | -63 | -8127 | -4410 | -2231 | -1260 | 0 | 0 |
| .. | .. | .. | .. | .. | .. | .. | .. |
| 511 | -1 | -129 | -70 | -37 | -20 | 0 | 0 |

Fig. 18

DEFECTIVE NOZZLE COMPENSATION

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to printers, and in particular to ink jet printers.

BACKGROUND ART

Digital image printing systems which use multiple ink nozzles integrated within a print head have increased rapidly in popularity in recent years. Either at manufacture, or during operation, the particular printing nozzles within a print head can fail to deliver ink droplets of the required size, or alternatively, with the required positional accuracy. These problems can arise from a combination of manufacturing flaws, and wear and tear. In extreme cases, individual nozzles can fail to deliver any ink whatsoever, due to being blocked or damaged.

Defective nozzles, be they blocked or merely defective in terms of their performance, can be identified manually or automatically by examining test print output.

Even where nozzles delivery ink droplets satisfactorily, the nozzles can vary in their characteristics, and produce uneven print densities, U.S. Pat. No. 5,038,208 entitled "Image Forming Apparatus with a Function for Correcting Recording Density Unevenness" describes a method and apparatus related to improving the evenness of print density produced by nozzles of varying characteristics. The patent discloses a printer having a multi-nozzle printing head, this printer also storing data associated with the image-forming characteristics of each of the multi-nozzle heads. Furthermore, a corrector means for correcting the image forming signals based upon the data stored in memory corresponding to the multi-nozzle head characteristics is disclosed. The aforementioned correction is performed either by retrieving a corrected value from a memory, or by retrieving a correction value from a memory, and adding the correction value to the uncorrected image value. In both cases, the image correction data is accessed using both the uncorrected image value, and a nozzle counter value. This type of correction is known as "head shading". Head shading methods do not, however, satisfactorily eliminate print artefacts where a blocked nozzle is present, or where the ink ejection performance of a nozzle fails to meet minimum requirements.

DISCLOSURE OF THE INVENTION

It is an object of the present invention to substantially overcome, or at least ameliorate, one or more disadvantages of existing arrangements.

According to a first aspect of the invention there is disclosed an image recording apparatus comprising:

(a) a plurality of forming elements for forming an image using image recording signals, said image according with a corresponding plurality of input image forming signals;

(b) memory means for storing data for said forming elements indicating the relative desirability of utilising said forming elements for forming the image; and (c) image processing means for computing said image recording signals using said input image forming signals and said data stored in said memory means, wherein the use of a particular forming element is thereby biased dependent upon the relative desirability data of other forming elements, the corresponding input image forming signal for the particular forming element, and a term for the particular forming element.

According to another aspect of the invention, there is disclosed an image recording apparatus comprising:

(a) a plurality of forming elements for forming an image according to input image forming signals;

(b) memory means for storing data for said forming elements indicating the relative desirability of utilising said forming elements for forming an image;

(c) image signal modification means for redistributing values of said input image forming signals based on said data stored in said memory means so as to bias the use of said forming elements, wherein the use of a particular one of said forming elements is thereby biased dependent upon the relative desirability data of other forming elements, a corresponding input image forming signal for the particular forming element, and a term for the particular forming element.

According to another aspect of the invention, there is provided a method, in printing an image, of compensating for one or more defective printer nozzles in a plurality of printer nozzles, said method comprising the steps of:

biasing, for each first image value associated with a first nozzle, at least one second image value associated with another nozzle, said biasing being dependent upon said first image value and a term for said first nozzle; and printing the image in accordance with the biased image values, said biasing reducing print artefacts otherwise caused by the one or more defective nozzles.

According to another aspect of the invention, there is provided a method of printing a multi-level halftoned image comprising the steps of:

adjusting a relationship between input image values and corresponding average halftone output values.

The biasing of other nozzles can be performed in various ways. This includes image value redistribution from a defective nozzle to immediately neighbouring nozzles of a same colour. The redistribution can be either partial, being constrained by a normal operating range of the neighbouring nozzles, or complete, in the case where neighbouring nozzles can support extended range, ie "super-intensity" printing. Alternatively, or in addition, cross colour compensation can be performed, whereby biasing is performed with respect to a corresponding nozzle of a different colour. The increased range of super-intensity image values can be compensated for by using range-reduction mapping, in particular, based upon checkerboard quantisation. In the event that biased images are subsequently halftoned, a transfer function between input image values and corresponding average halftone output values can be adjusted, in order to tune utilisation of super-intensity printing.

According to another aspect of the invention, there is provided an apparatus for implementing any one of the aforementioned methods.

According to another aspect of the invention there is provided a computer program product including a computer readable medium having recorded thereon a computer program for implementing any one of the methods described above.

BRIEF DESCRIPTION OF THE DRAWINGS

A number of preferred embodiments of the present invention will now be described with reference to the drawings, in which:

FIG. 18 shows a tuned 3 level halftone error diffusion table;

DETAILED DESCRIPTION INCLUDING BEST MODE

Figure 1:
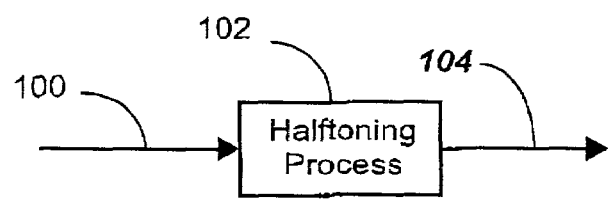
FIG. 1 depicts a prior art halftoning arrangement.

Where reference is made in any one or more of the accompanying drawings to steps and/or features, which have the same reference numerals, those steps and/or features have for the purposes of this description the same function(s) or operation(s), unless the contrary intention appears.

The principles of the preferred methods described herein have general applicability to printing devices which have a multiplicity of print-forming means integrated into a single printing head. However, for ease of explanation, the steps of the preferred methods are described with reference to ink jet printers. It is, however, not intended that the present invention be limited thereto.

Arrangements of the present invention are applied to image printing systems, having recording heads each of which has an array of recording elements, and which uses data describing defective recording elements in order to provide an improved printer output. For ease of illustration, the description is directed to multiple print heads each having a linear array of ink jet nozzles, however the embodiments can be extended to other types of printing systems.

A common aspect of the apparatus and methods encapsulated in the described embodiments is the use of defective nozzle data. This is used for reducing the use of defective nozzles, and for correspondingly increasing use of non-defective nozzles which print in the vicinity of the positions at which the defective nozzles print. This has the effect of reducing print artefacts caused by the defective nozzles. Where inter-nozzle spacing is sufficiently small, the aforementioned redistribution of nozzle use, or "cross-nozzle" compensation, results in significant reduction in artefacts. Accordingly, print heads which are either manufactured with defective nozzles, or which develop defective nozzles over time, can continue to be used while producing good quality output.

One approach for providing cross-nozzle compensation is to reduce image values associated with defective nozzles, correspondingly increasing the image values associated with neighbouring, non-defective nozzles. This can be achieved by a image redistribution process which is further described in relation to the first and second embodiments (eg see FIGS. 4 and 8). In colour printing, an additional approach for providing cross-nozzle compensation is available. This is to compensate for a defective nozzle of a first colour component by increasing an image value associated with a corresponding nozzle of a second colour, ie one which prints at the same position as the defective nozzle. This is described further with respect to the first embodiment (eg see FIG. 10).

In a first arrangement, image value redistribution is performed in a manner which restricts the redistribution so that resultant image values of the receiving nozzles (ie., the neighbouring nozzles), remain within their "normal" range. The "normal" range of a printer nozzle is considered to be that range which, during normal operation, supports the printing of intensity values between "0" and "maximum", or in 8-bit numeral terms, between 0 and 255. In the first embodiment, since there is a restriction on the amount of error which can be redistributed to neighbouring nozzles, in general the complete image value assigned to a defective nozzle will not always be able to be completely redistributed. This can be overcome, by using the residual, ie undistributed, image value to perform compensation by manipulating the image values of other colour components.

In a second arrangement, image value redistribution is performed in a manner which allows the receiving nozzles to exceed their normal range, and an increased, ("superintensity") ink ejection per colour component per pixel is permitted, beyond that which is required to provide normal full ink coverage of the paper. The second embodiment also discloses a method of tuning how often the superintensity ink ejection is provided.

In an ink-jet printer, image data is typically converted to nozzle firing control data. The image data is typically multi-tone colour data which must be converted into nozzle firing data in order to control the ink ejection of the nozzles of the print heads.

The nozzle firing data for a multi-tone colour image can be considered as a colour image with a reduced number of colour intensity values per pixel. The process of determining image data with a reduced number of intensity values per pixel is referred to as "halftoning".

For ease of explanation, a rectangular array of pixels is assumed, with each pixel having an intensity value for each one of the colour components Cyan, Magenta, Yellow and Black. Equivalently, the multi-tone colour image can be considered as a set of four rectangular arrays of intensity values, one array per colour, each array having the same physical dimensions. Intensity values are represented as 8-bit numbers, having a value in the range of 0 to 255. Value 0 corresponds to a minimum colour density (i.e., no deposition), and the value 255 corresponds to a maximum colour density (i.e., full ink deposition).

Nozzle firing data is generated from the aforementioned image data, and comprises an array of nozzle firing values, one array for each colour component.

Again for ease of explanation, for each colour component, the dimensions of the nozzle firing array are assumed to be the same as the dimensions of the corresponding array of multi-tone image intensity values. Accordingly, it is assumed that there is a one-to-one correspondence between multi-tone image pixels, and positions in a nozzle firing array, so that the description is not burdened by spatial resolution conversion issues. In the event that nozzle separation in a print head is different to the input image pixel spacing, image values for nozzles can typically be derived from pixel image values by interpolation, or by resolution conversion algorithms. After such conversion, defective nozzle compensation can then be applied to the nozzle image values.

Typically, for each colour component, there is one nozzle firing position for each position in a nozzle firing array. This is not always the case however. For example, in the second embodiment, there are two nozzle firing positions corresponding to each position in a nozzle firing array.

In the first arrangement, each nozzle firing value is a 1-bit number, where the value "0" indicates that ink should not be ejected for that position in the nozzle firing array, and a value "1" indicates that ink should be ejected. In the second embodiment, each nozzle firing value may be 0, 1 or 2, this value indicating the number of ink droplets to be ejected for that position in the nozzle firing array.

FIG. 1 depicts a prior art halftoning arrangement. A multi-tone 8 bit image value 100 is input into a halftoning process 102, which produces a nozzle firing value 104. The halftoning process is often described as a "binarisation" process, since in the present case it generates data describing whether a nozzle should fire or not at each nozzle firing position. Halftoning may be performed by error diffusion or dithering, and typically, each colour component is halftoned independently.

Figure 2:
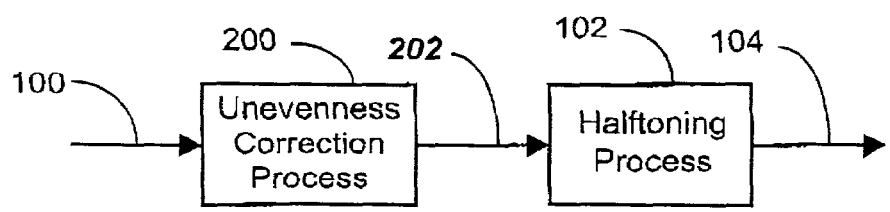
FIG. 2 illustrates a prior art unevenness correction, and halftoning arrangement.

In FIG. 2 the 8-bit multi-tone image array value 100 is processed by an unevenness correction process 200 prior to the halftoning process 102. This optional prior art arrangement is described in the cited U.S. Pat. No. 5,038,208.

Figure 3:
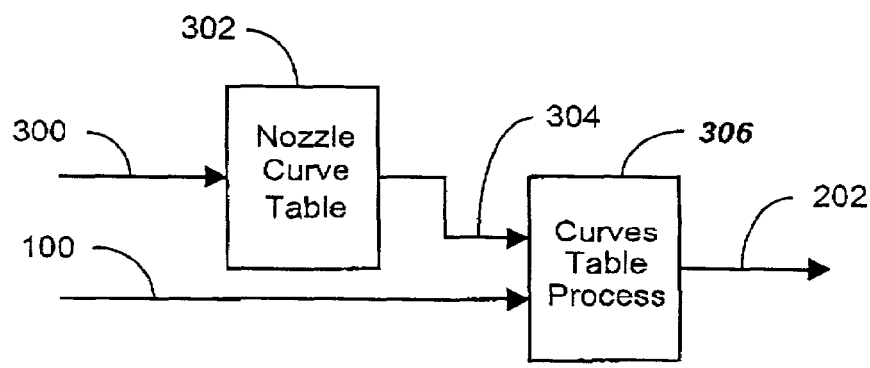
FIG. 3 shows the unevenness correction process in FIG. 2 in more detail.

FIG. 3 provides more detail about the aforementioned unevenness correction process. Each nozzle is associated with a curve which characterises its performance. This curve is a mapping, for each nozzle, from an uncorrected 8-bit image value, to an unevenness-corrected 8-bit image value. A nozzle counter value 300 is used to retrieve a curve value from a nozzle curve table 302. The curve value 304 which is selected and output is processed in accordance with the 8 bit multi-tone image array value 100 in a curve table process 306. This process 306 produces an unevenness corrected image value 202.

Figure 4:
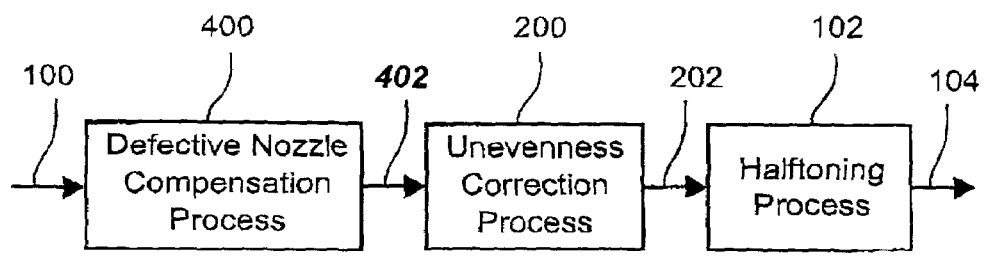
FIG. 4 depicts an arrangement for defective nozzle compensation in accordance with a preferred embodiment of the present invention.

FIG. 4 illustrates a defective nozzle compensation arrangement. The 8 bit multi-tone image array value 100 is input into a defective nozzle compensation process 400. This process 400 outputs a redistributed image value 402. This redistributed value 402 has the same precision, i.e., 8-bits, as the multi-tone image array value 100. Thereafter, the redistributed image value 402 is input into an unevenness correction process 200, and subsequently, into the halftoning process 102, in order to produce the final processed nozzle firing array value 104. It is noted that the defective nozzle compensation process 400 is performed prior to the unevenness correction process 200, and prior to the halftoning process 102. Alternatively, defective nozzle compensation 400 can be performed prior to the halftoning process 102, and the unevenness correction process 200 can be omitted.

Figure 5:
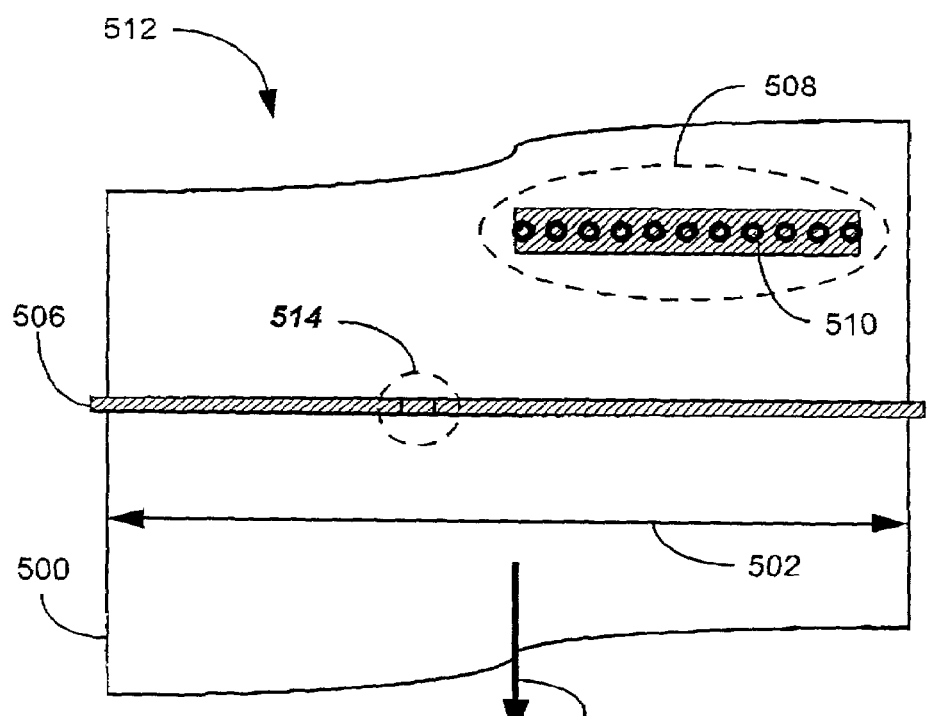
FIG. 5 shows a full-width fixed head printer whereupon the arrangement in FIG. 4 can be applied.

FIG. 5 illustrates a full-width fixed head printer, in which a sheet of paper 500 having a width 502 and being fed in a direction depicted by an arrow 504 passes beneath a full width print head 506. A segment 514 of the stationary print head 506 is shown in more detail in an inset 508, where it is seen to comprise a plurality of individual print nozzles 510. A print head for each colour component is provided, each of these heads being oriented at right angles to the paper feed direction depicted by the arrow 504. The print head 506 is fixed, and ink is ejected from each of the print head nozzles, e.g., 510, while the paper is advanced underneath the print head. An entire row (i.e., scanline) of the image is printed at a time. An individual printer nozzle, e.g., 510, is restricted to printing dots of a column of pixels, since the print head 506 is fixed in position.

Figure 6:
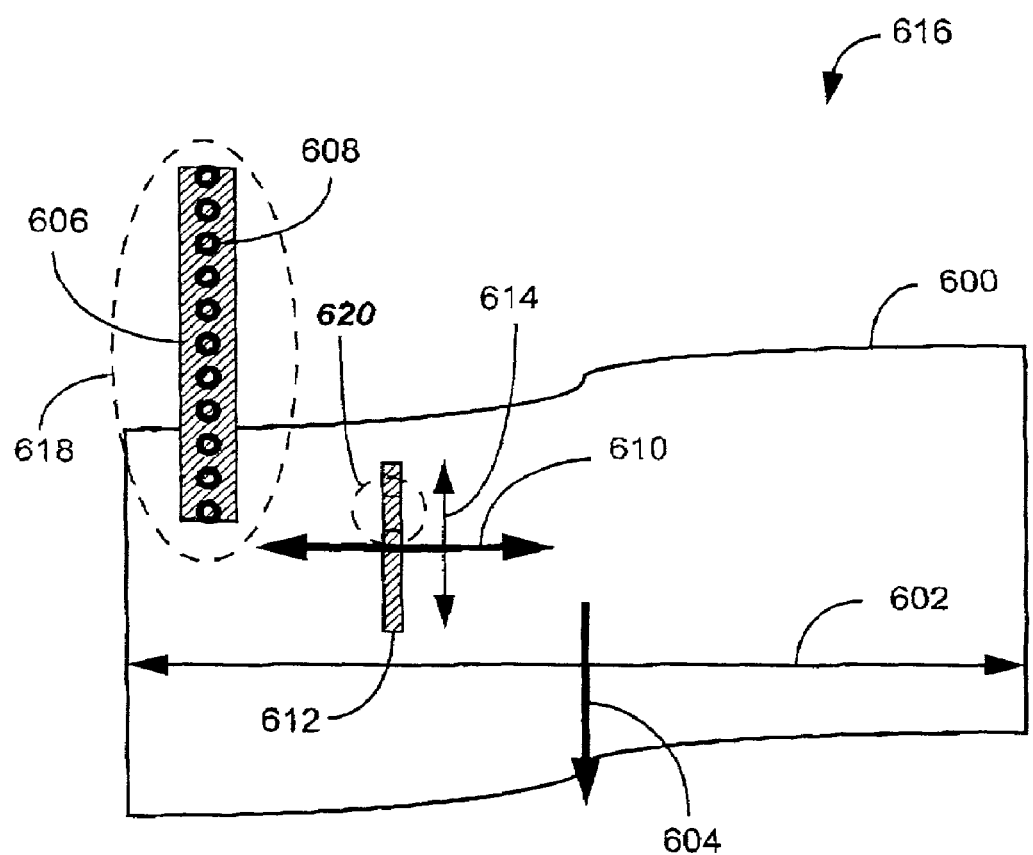
FIG. 6 shows a shuttle-head printer, to which the arrangement in FIG. 4 can be applied.

FIG. 6 illustrates a shuttle-head ink jet print system, in which a sheet of paper 600, having a width 602, is fed in a direction depicted by an arrow 604. A shuttle print head 612 moves at right angles across the paper 600, as depicted by a bi-directional arrow 610. A segment 620 of the print head 612 is shown in more detail 606 in an inset 618. This shows that the print head 612 comprises a plurality of individual printer nozzles 608. A print head 612 is provided for each colour component, and each print head 612 is oriented parallel to the paper feed direction as depicted by the arrow 604. The print heads 612 move over the paper at right angles 612 to the paper feed direction 604, with ink being ejected from the print head nozzles 608 while the paper 600 is stationary, and the print heads 612 are performing a shuttle scan across the page 600. A band of scanlines is printed in one pass of the shuttle print heads. The width of the band of scanlines printed in a single pass of the shuttle print head 612 is restricted by the length of the print head 614. In any given pass of the shuttle print heads, an individual nozzle, 608 is restricted to printing dots of a particular scanline (i.e., a row) of pixels. Between passes of the shuttle print head 612, the paper 600 is advanced in the paper feed direction 604, so that successive bands of scanlines can be printed. Typically, to reduce printer artefacts due to nozzle inconsistencies, the paper 600 is advanced in a direction 604 by only a fraction of the length 614 of the band of scanlines printed by one pass of the shuttle print head. In this manner, each scanline is printed using multiple passes of the shuttle print head 606. Dots of a colour component of a scanline are accordingly printed by a different nozzle of the same print head for each pass.

In both styles of printer, i.e., the full-width fixed head printer (see FIG. 5), and the shuttle-head printer (see FIG. 6), the relative movement between the print heads (506, 612)

and the paper (500, 600) is at right angles to the respective print head. Each nozzle (510, 608) prints a line of dots. Neighbouring nozzles print neighbouring lines of dots.

Figure 7:
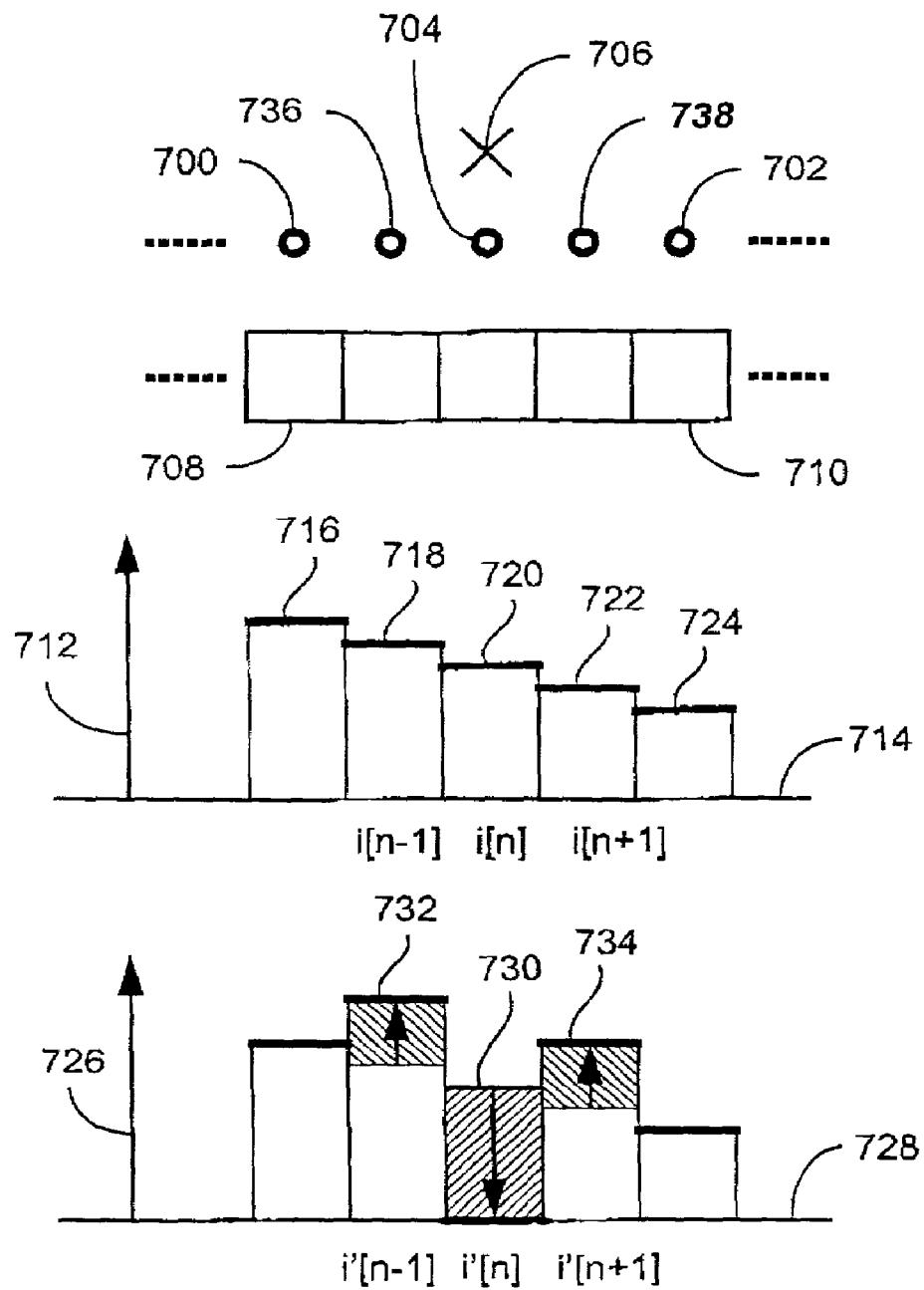
FIG. 7 illustrates redistribution of image values from a defective nozzle to neighbouring non-defective nozzles in a first embodiment of the invention.

FIG. 7 illustrates image value distribution from a defective nozzle to neighbouring non-defective nozzles. A line of nozzles 700 to 702 within a print head (not shown) is depicted. A defective nozzle 704 is indicated by an "X" i.e., 706. A line of rectangular pixels 708 to 710 is shown adjacent to the line of nozzles 700 to 702. The aforementioned representation is equally applicable to a full-width fixed head printer, and to a shuttle head printer arrangement. A graph with axes of image value 712 against pixel number 714 illustrates a desired sequence of descending image values 716 to 724. These are the assigned image values which are desired to be printed by the print head. Since the nozzle 704 is defective, the desired image value 720 cannot be printed. The graph of actual image value 726 against pixel number 728 illustrates the actual printed image values after image value redistribution. It is noted that the image value 730 which corresponds to the defective nozzle 704 has a 0 image value, while the immediately neighbouring pixels have image values 732 and 734, these having being increased in order to compensate for the 0 image value 730. The result of redistributing the image value from the defective nozzle 704 to the neighbouring nozzles 736 and 738 is that dots which would otherwise have been allocated to the defective nozzle, were it not defective, are instead printed by the nozzles 736, 738 which are situated on either side of the defective nozzle 704.

Figure 8:
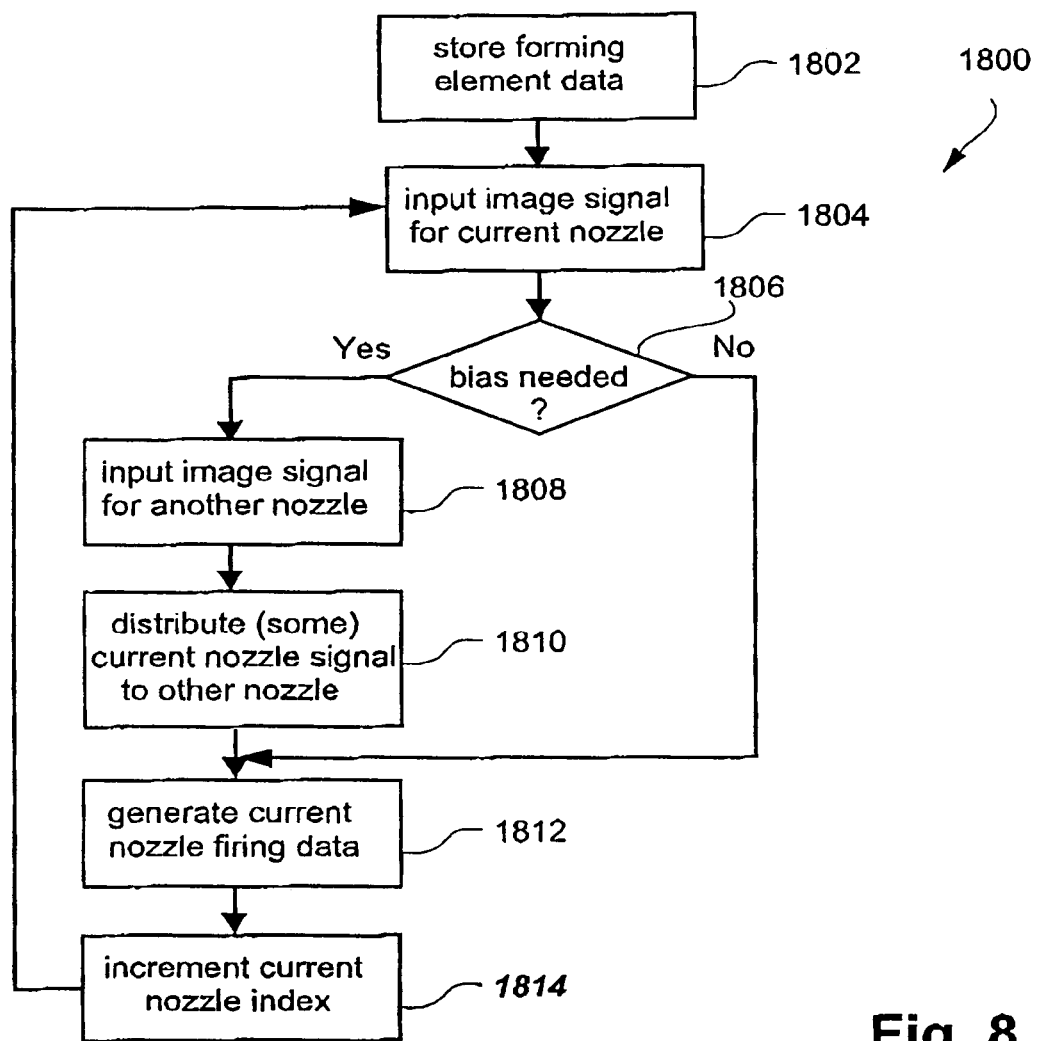
FIG. 8 shows a process for redistribution of image values in accordance with the arrangement illustrated in FIG. 7.

FIG. 8 shows a process for redistribution of image values in accordance with the arrangement described in regard to FIG. 7. In a first step 1802 of the process 1800, data corresponding to relative desirability of using various forming elements are determined and stored. Thereafter, in a step 1804, an input image signal for a current nozzle is input. In a following decision step 1806, a determination in made, depending for example, upon a measure of desirability for the current nozzle, whether bias is required. If bias is indeed needed, then the process 1800 is directed in accordance with a "yes" arrow to a step 1808 in which an input image signal for another nozzle is input. In a following step 1810, some or all of the input image signal for current nozzle is distributed to the other nozzle, ie. the input image signal for the current nozzle is added to the input image signal for the other nozzle. Thereafter, in a step 1812, the current nozzle firing data is generated. In a following step 1814, an index for the current nozzle is incremented, after which the process 1800 is returned to the step 1804. Returning to the decision step 1806, if the decision step determines that bias is not after all required, then the process 1800 is directed in accordance with a "no" arrow to the step 1812, which generates the nozzle firing data. It is noted that the initial step 1802, in which relative desirability data for the various forming elements are stored, is performed only at the outset of the process 1800.

Figure 9:
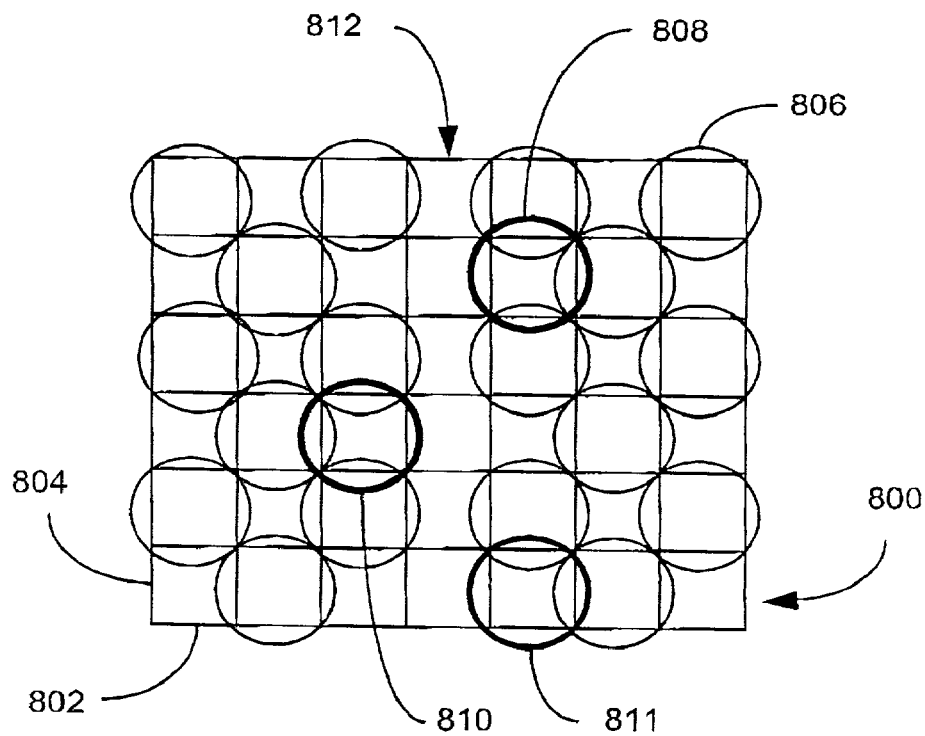
FIG. 9 illustrates a pattern of printed dots in a single colour which is output by the arrangement in accordance with FIG. 7.

FIG. 9 depicts a patterns of dots of a single colour component which are to be printed according to values in a nozzle firing array. Dots can be printed at positions on a rectangular grid 800, which consists of vertical grid lines 804 and horizontal grid lines 802. In the figure, dots have been shown in outline only, eg. 806, so that the pixel grid 800, remains visible. The rectangular grid 800 allows for one dot per grid position All dots of a particular grid column are printed by the same nozzle. In the figure, a nozzle corresponding to the centre column of pixels 812 is defective. The illustrated dot outlines correspond to a nozzle firing value array generated using defective nozzle compensation by image value distribution, followed by halftoning, for an image region of near 50% intensity. As a result of the defective nozzle compensation by image value distribution, no dots are printed in grid column 812, and accordingly, additional dots 808, 810 and 811 are printed in the neighbouring grid columns. Due to the additional dots 808, 810 and 811, average ink deposition near the blocked nozzle is not reduced, and accordingly, the 50% intensity of the image values is reproduced in the average ink deposition. Advantageously, this desired average ink deposition is maintained with reduced print artefacts due to the defective nozzle. This advantageous performance is maintained both where the defective nozzle is blocked, or alternatively, where it is defective and, for example, ejects ink unreliably, too far to one side or the like.

A C programming language code fragment is now presented in relation to a first embodiment of the present invention, i.e., defective nozzle compensation by restricted image value redistribution for a full-width fixed head printer. For ease of explanation, it is assumed that (i) there is one nozzle per pixel of a scanline, and (ii) the defective nozzle data consists of a one-bit value for each nozzle, indicating whether or not the associated nozzle is defective, and (iii) image intensity is redistributed using only nearest neighbour nozzles, i.e., pixels.

```
clamp_val = 255;
...
/*
The following processing is performed one pixel at a time
(ie one nozzle at a time)
from the first pixel of a scanline to the last.
*/
/*
if the current pixel's nozzle is defective
and the next pixel's nozzle is not defective
then distribute as much as possible of remaining intensity
of current pixel to next pixel
*/
if (defective[n] && !defective[n + 1])
{
old_val = image[n + 1];
new_val = image[n + 1] + image[n];
if (new_val > clamp_val)
{
    new_val = clamp_val;
}
image[n + 1] = new_val;
image[n] -= new_val - old_val;
}
/*
if the current pixel's nozzle is not defective
and the next pixel's nozzle is defective
then distribute as much as possible of half intensity
of next pixel to current pixel
*/
if (!defective[n] && defective[n + 1])
{
old_val = image[n];
new_val = image[n] + image[n + 1]/2;
if (new_val > clamp_val)
{
    new_val = clamp_val;
}
image[n] = new_val;
image[n + 1] -= new_val - old_val;
}
```

Prior to image value re-distribution, the 8 bit image values fall into the range 0 to 255, and accordingly, image values of 0 and 255 represent an unbiased operating range of 0% and 100% respectively. The above code associated with the first embodiment restricts the dynamic range after re-distribution to the same range ie 0 to 255, and accordingly, image values of 0 and 255 represent a biased operating range of 0% and 100% respectively.

It is found, for the case where nozzle separation is equal to 1/600 of an inch, that restricted image value redistribution as described above significantly reduces streaking artefacts which typically occur in the presence of a blocked or non-firing nozzle.

When the image region to be printed consists of a constant image value which is less than or equal to (2/3) *255, all of the image value of the non-firing nozzle is, by virtue of the aforementioned image value, able to be distributed to immediately neighbouring nozzles. For such image regions, defective nozzle compensation using restricted image value redistribution as described previously, provides a clear reduction in the streaking artefact which typically occurs as a consequence of a non-firing nozzle.

In contrast however, where the image region to be printed consists of a constant image value greater than (2/3) *255, then some of the image value of the non-firing nozzle is unable to be distributed to its immediately neighbouring nozzles. In such cases, a streak due to the non-firing nozzle remains visible even after defective nozzle compensation using the restricted image value redistribution as described.

In summary, defective nozzle compensation using restricted image value redistribution is limited by the range restriction of the immediately neighbouring print nozzles. This means that a residual image value, equal to the amount which could not be redistributed, is "retained" by the blocked nozzle.

The concept of image redistribution can, however, be extended as will now be described. In a multi-colour printing arrangement, the aforementioned residual image value, ie. the value which cannot be redistributed to immediately neighbouring nozzles, can nonetheless be used for "cross-colour" compensation. Cross-colour compensation relates to the fact that print artefacts which may normally be produced as a result of a blocked nozzle of a first colour component, can often be reduced by printing dots of another colour component, in the area where dots of the first colour component are missing. In other words, cross-colour compensation is the use of other colour components to reduce artefacts due to defective nozzles in a first colour.

Figure 10:
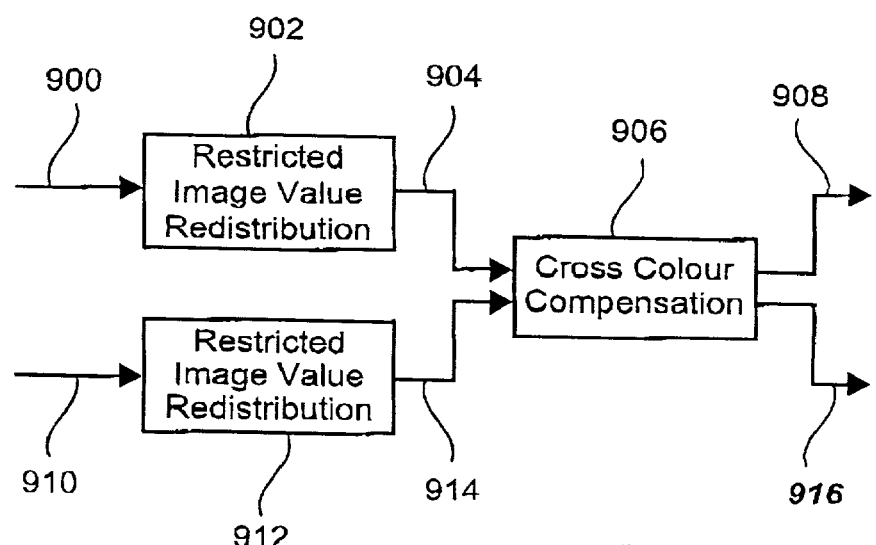
FIG. 10 shows defective nozzle compensation using cross-colour compensation according to a first embodiment of the present invention.

FIG. 10 shows how defective nozzle compensation using restricted image value redistribution as previously described can be extended to incorporate cross-colour compensation for the Cyan and Magenta colour components where either, or both the print heads associated with Cyan and Magenta may have blocked nozzles. FIG. 10 shows an 8-bit Cyan image array value 900 being input into a restricted image value redistribution process 902. Similarly, an 8-bit Magenta image array value 910 is input into a restricted image value redistribution process 912. Thereafter, the 8-bit redistributed image values 904 and 914 respectively are fed into a cross-colour compensation process 906. The cross-colour compensation process 906 makes use of cross-colour compensation to correct for artefacts caused within each of the Cyan and Magenta images, resulting from respective blocked nozzles in each separate print head. The cross-colour compensation process 906 outputs an 8-bit Cyan nozzle compensated image value 908, and an 8-bit Magenta nozzle compensated image value 916.

The processing performed in the cross-colour compensation process 906, this being performed on a per pixel basis for both Cyan and Magenta, is described in the following C language code fragment:

```
/*
if Cyan nozzle is defective and Magenta nozzle is not defective
then augment the Magenta image value
*/
if (cyan_defective[n] && !magenta_defective[n])
{
new_val = magenta[n] + f1 * cyan[n];
if (new_val > 255)
{
    new_val = 255;
}
magenta[n] = new_val;
}
/*
if Cyan nozzle is not defective and Magenta nozzle is defective
then augment the Cyan image value
*/
if (!cyan_defective[n] && magenta_defective[n])
{
new_val = cyan[n] + f2 * magenta[n];
if (new_val > 255)
{
    new_val = 255;
}
cyan[n] = new_val;
}
```

The aforementioned C code provides Magenta colour compensation for a defective Cyan nozzle, or vice versa, on a per pixel basis. The values of the parameters f1 and f2 are determined by experiment. For 600 dots per inch (dpi) printing, values f1 and f2 equal to 0.2 provide good reduction of streaking artefacts due both to (i) a non-firing Cyan nozzle in an image region of high Cyan and low Magenta values, and (ii) a non-firing Magenta nozzle in an image region of low Cyan and high Magenta values.

Since the Cyan/Magenta cross-colour compensation for a non-firing Cyan nozzle is effective in high Cyan image regions, and since restricted image value distribution is effective for image regions up to 2/3 maximum image value, it is seen that these two methods compliment each other. Accordingly, for 600 dpi printing, the combination of restricted image value redistribution, followed by Cyan/Magenta cross-colour compensation, provides a good reduction in streaking artefacts due to either a blocked Cyan nozzle or a blocked Magenta nozzle, over most of the printer gamut.

A second arrangement is now proposed to improve the effectiveness of defective nozzle compensation by image value redistribution, this time through the use of print systems which can eject more ink per nozzle than is typically required to achieve a full ink coverage of the paper. In other words, this embodiment relates to extending the range of a print nozzle beyond the 0–255 normal boundaries. This type of printing will hereafter be referred to as super output intensity printing.

Figure 11:
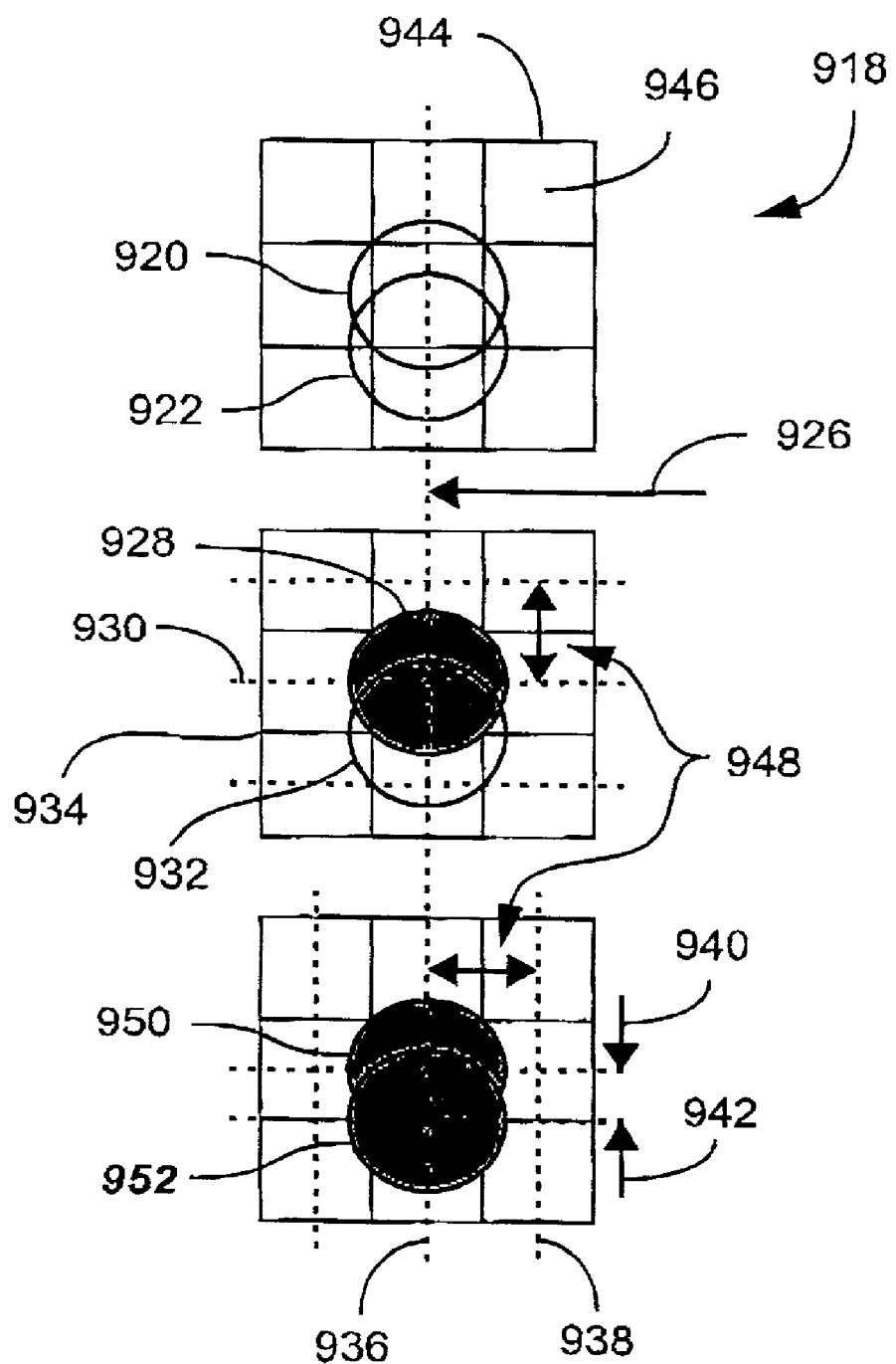
FIG. 11 provides an example of printable dots-per-nozzle for a pixel in accordance with a second embodiment of the present invention.

FIG. 11 shows an example of dots printable per nozzle per pixel for a single colour component for super output intensity printing. A pixel grid 944 comprising adjacent rectangular pixel positions 946 typically provides for pixel separation of 1/600 inch in both directions 948. Super output intensity printing, however, enables dots to be printed with half the aforementioned separation, ie., 1/1200 inch, as shown by dots 950, 952, which are separated by 1/1200 inch as indicated by arrows 940, 942. In the present example, print nozzles are separated by 1/600 inch along the print head, however each nozzle can fire twice during relative movement of the head and the paper, through 1/600 inch.

Nozzle firing data associated with pixels to be printed can be represented as an array for each colour component, the array comprising values in the range 0 to 2. Each value thus represents nozzle firing data for a particular colour component, and for a particular pixel. The value (ie. halftone output level) "0" corresponds to no dots printed for the pixel; value "1" corresponds to 1 dot printed for the pixel, and the value "2" corresponds to 2 dots printed for the pixel. Since the print system is designed to achieve full ink coverage of the paper by depositing 1 dot per pixel position 946, and the print system is able to eject two dots per pixel position, it is possible to ensure that the average volume of ink deposited in the vicinity of a nozzle is not reduced when a single nozzle is not firing.

Figure 12:
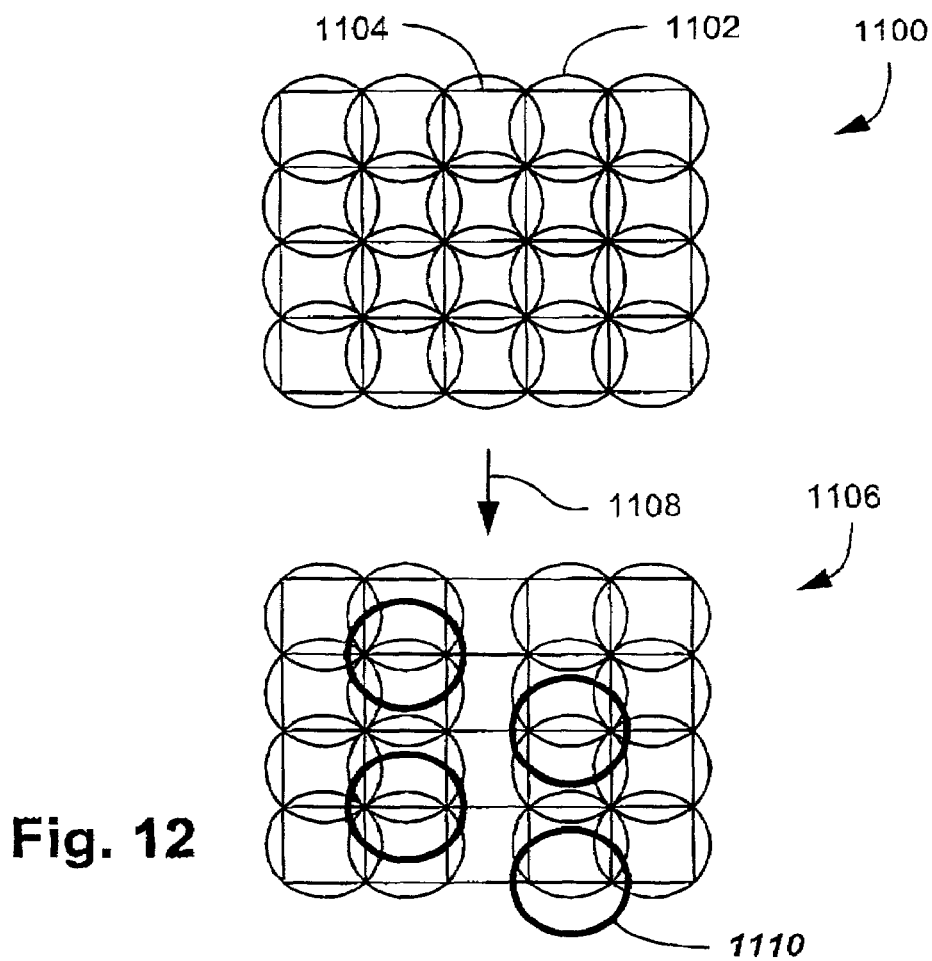
FIG. 12 illustrates "full" paper coverage by dots of a single colour both with and without defective nozzles being present.

FIG. 12 shows a pixel grid 1104 fully covered, in the ideal situation, by individual dots 1102. In the event that a print nozzle is blocked, and thus unable to fire in a column depicted by an arrow 1108, super intensity printing is used to produce additional printed pixel dots 1110, thus maintaining the required average ink deposition in the region of the unprintable column 1108. The actual printed dot pattern 1106 is an approximation to the desired printed dot pattern 1100. Super intensity output printing also takes advantage of the fact that printed dots typically swell when they overlap, and consequently, in super intensity output printing 1106, increased dot swelling can be expected in the region of the super intensity output dots 1110, thereby reducing the area of paper uncovered by ink 1108.

FIG. 12 describes a particular method of performing super output intensity printing, this being by ejecting an extra ink droplet per pixel per colour component. This is depicted by overlapping dots 950, 952 having a spacing half the normal spacing 940, 942 (see FIG. 11).

Alternatively, more than one extra droplet per pixel position may be ejected, larger ink droplets may be ejected, or a combination of the aforementioned methods may be used.

The use of super intensity output printing results in full, or complete image value redistribution. This differs from restricted image value redistribution, in that the redistribution is not limited by the normal range of the pixels receiving the redistributed image values. The image values of the receiving pixels can accordingly be increased beyond their normal maximum boundary values. Assuming that (i) there is one nozzle per pixel of a scanline, (ii) defective nozzle firing data consists of a 1 bit value for each nozzle, indicating whether or not the associated nozzle is defective, and (iii) image intensity is redistributed using only nearest neighbour pixels, then the C code relating to restricted image value redistribution which has been provided is applicable, except that the value used to clamp resulting image values is changed to 510 (ie., twice the normal level of 255, and accordingly, image values of 0 and 510 represent a biased operating range of 0% and 200% respectively). Given this new clamping value, and where there is a single defective nozzle, the total image value associated with the defective nozzle can be redistributed to pixels corresponding to neighbouring nozzles. The image values of such neighbouring pixels will now fall in a range of 0 to 510, which requires 9 bits for representation. Accordingly, the original 8 bit input image value, eg. 100 in FIG. 1, has now been increased to a 9 bit image value after full image value redistribution. It is desirable to map the resultant 9 bit image values back to the original 8 bit dynamic range, in order to avoid modifying one or more of the unevenness correction process 200, and the halftoning process 102 (see FIG. 4). In particular, if the number of bits required to represent image values input to the unevenness correction process 200 is increased from 8 to 9 bits, then that process 200 requires either a two-old increase in the size of the curve tables, or alternatively, more complex processing.

Figure 13:
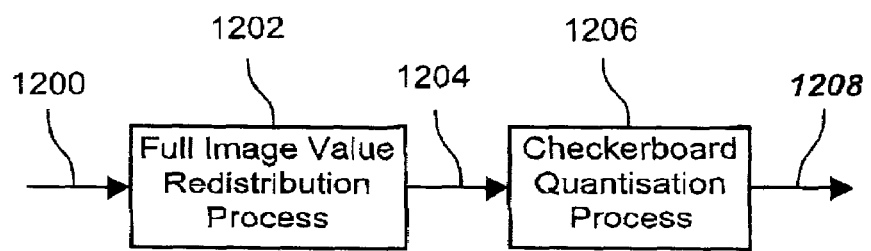
FIG. 13 shows the application of quantisation correction in a preferred embodiment of the present invention.

FIG. 13 shows an 8 bit multi-tone image array value 1200 being input into a full image value redistribution process 1202, which outputs a fully redistributed image value array 1204 having a 9 bit range. This output 1204 is input to a checkerboard quantisation process 1206, which reduces the 9 bit range of image values 1204 back to an 8 bit fully redistributed and quantised image value 1208 having a range of 8 bits. The checkerboard quantisation process 1206 effectively divides the image value 1204 by 2, alternately rounding fractional image values up, or down. The rounding is performed alternately according to a checker board pattern. Accordingly, if the sum of (i) the pixel scanline number, axed (ii) the pixel position within the scanline, is even, then the rounding is opposite to the rounding performed when the sum is odd. The checkerboard quantisation process also includes at least one instance of special case processing, this occurring if the input image value is 255, in which case the output image value is always rounded in the same direction. This special case processing is provided because image regions having an input value of 255, ie. the maximum input image value, should typically result in a halftone output corresponding to full ink coverage of paper. If this special case processing is not included, then the resultant halftone output for such image regions is a mix of halftone output levels, this non-uniform pattern being undesirable for image regions having a constant maximum input image value.

The checkerboard quantisation process 1206, which rescales the range of the image value 1204 from 9 bits back to 8 bits (1208), provides a number of advantages over simple truncation of image values to the most significant 8 bits. Although both checkerboard quantisation and simple truncation result in a range of 0 to 255 for a pixel, checkerboard quantisation produces a greater number of different resulting local average image values for pixels of a region, given an image region of constant input image value. For checkerboard quantisation therefore, a region of an input image which is a gradual blend from one image value to another, is represented by a smoother transition in local average image values. This reduces colour step artefacts which typically occur for simple truncation.

Super intensity output printing, which as described requires deposition of additional ink, can cause problems including unwanted ink swelling, increased paper wetting, and increased ink drying time. In order to optimise, or maximise the beneficial effect of super intensity ink deposition in the vicinity of a blocked nozzle, it is sometimes desirable that the frequency of super intensity ink deposition per pixel be reduced by tuning it down.

In contrast, another problem which can be associated with the use of super intensity output printing, is that if sufficient super intensity ink is not deposited on the paper often enough, then the unprinted line resulting from a defective printing nozzle will be insufficiently compensated for. It is thus advantageous, in this case, to tune the frequency of super intensity ink deposition per pixel, typically increasing the frequency in this instance.

Figure 14:
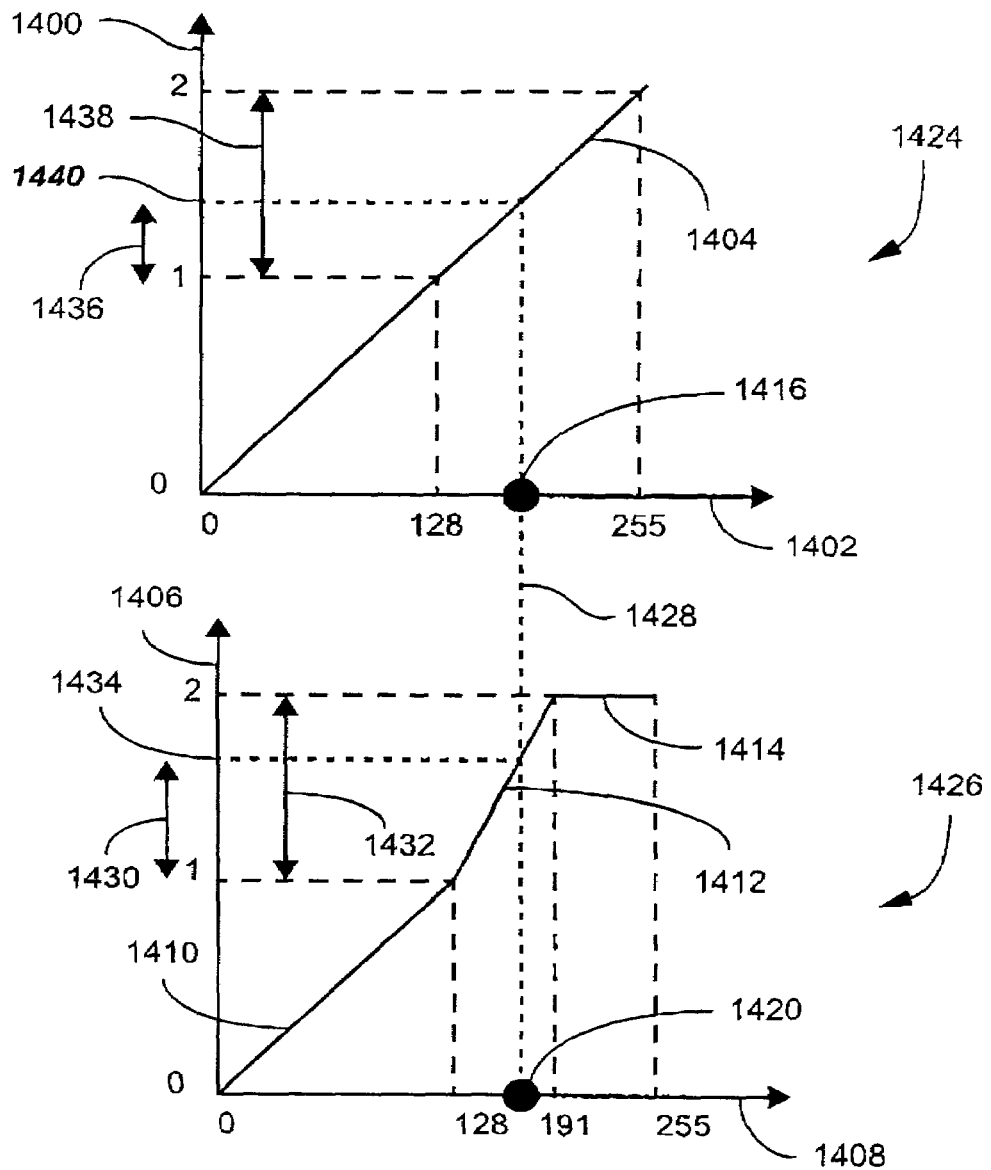
FIG. 14 illustrates tuning a three level halftone error diffusion transfer function.

FIG. 14 illustrates the aspect of tuning in the context of a three level halftone error diffusion process. The halftoning process is represented by a graph having an ordinate 1400 representing the average number of output dots printed (ie. 0, 1 or 2 dots per particular pixel), and an abscissa 1402 representing the input image value, ie. from 0 to 255 for super intensity output printing after checkerboard quantisation. The relationship, or transfer function, between the input image value and the average three level halftone output is typically depicted by the line 1404 which is linear across the input image value range. An input image value 1416 is seen to lie between the abscissa value "128" and the abscissa value "255", and the input image value 1416 will thus, by a three level error diffusion process, map either to a halftone output value of "1", or to a halftone output value of "2". For an input image region of constant input image value 1416, the proportion of cases in which the input image value 1416 maps to "2", equals the difference between the average halftone output of the input image value 1416, and the halftone output value "1" (ie. 1436). Turning to the lower graph in the figure, it is seen that the line 1404 has now been tuned, ie. adjusted, to take the form of three linear line segments 1410, 1412 and 1414. The input image value 1420 is the same as the input image value 1416, however, according to the tuned transfer function, for an input image region of constant input image value 1420, the proportion of cases that the input image value maps to "2", being the difference between the average halftone output of the input image value 1420, and the halftone output value "1", (ie. 1430), has increased. The effect of tuning the transfer function, ie. the line 1404, to the set of linear line segments 1410, 1412 and 1414, is thus to increase, on average, the utilisation of superintensity output double pixels. The line segment 1414 is horizontal, clamping all input image values lying between "191", and "255" on the abscissa 1408, to an output halftoned value of "2". The specific example of tuning shown in FIG. 14 is representative only, and the feature of tuning a multi-level halftoned output is clearly not limited thereto.

One method of tuning the halftoning transfer function and adjusting how often superintensity ink deposition is performed, is provided by simply remapping image value prior to halftoning, for example, by use of a lookup table. An alternative effective method of tuning the halftoning transfer function, and thereby adjusting how often superintensity ink deposition is performed, is provided by performing halftoning by error diffusion with a modified error diffusion table. This method of tuning by use of a modified error diffusion table, is now described.

Figure 15:
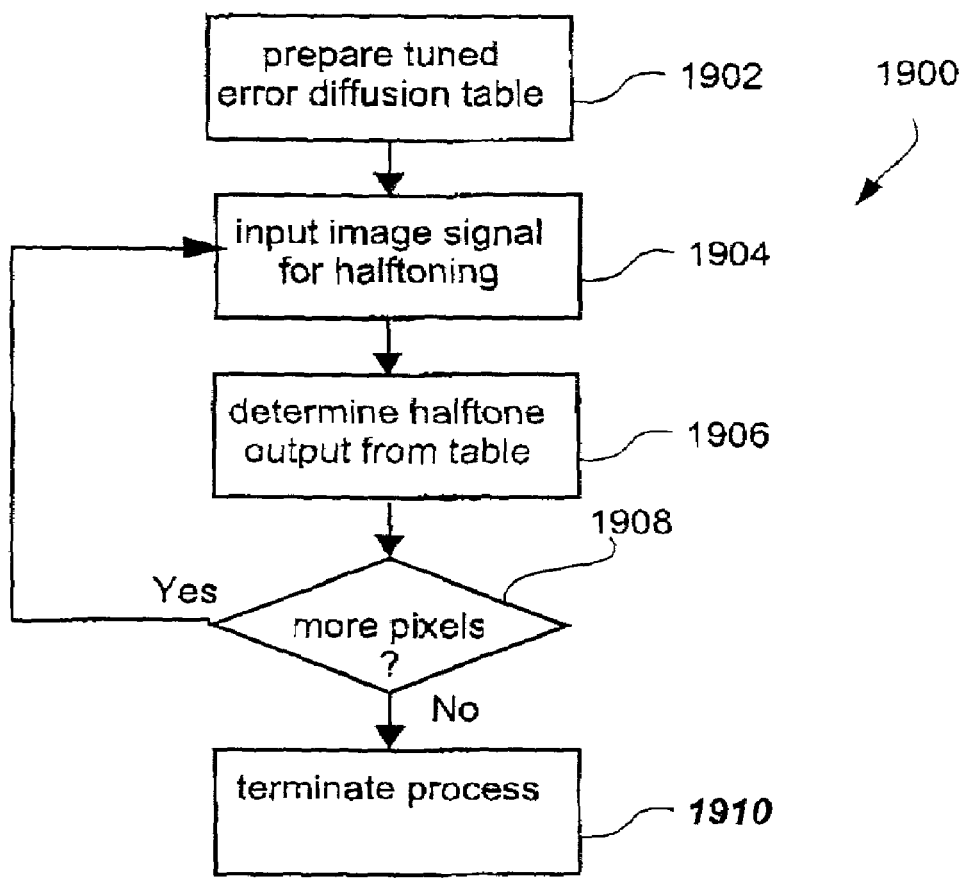
FIG. 15 depicts a process for printing a halftoned image using a tuned error diffusion table.

FIG. 15 shows a process 1900 whereby a tuned error diffusion table is used to print a multi-level halftoned image. In a first step 1902, a tuned error diffusion table is prepared, for example using the techniques described in relation to FIGS. 17 and 18. Thereafter, in a step 1904, an input image signal for halftoning is input into the process 1900. In a following step 1906, a corresponding halftone output for the input image signal is determined from the table. It is noted that this will be a "tuned" output, resulting from the aforementioned step 1902. In a following step 1908, the process 1900 determines whether more pixels are required to be processed. If there are further pixels in this category, then the process 1900 is directed in accordance with a "yes" arrow back to the step 1904. If, on the other hand, no more pixels are required to be processed, then the process 1900 is directed in accordance with a "no" arrow to a step 1910, at which stage the process 1900 is terminated.

Figure 16:
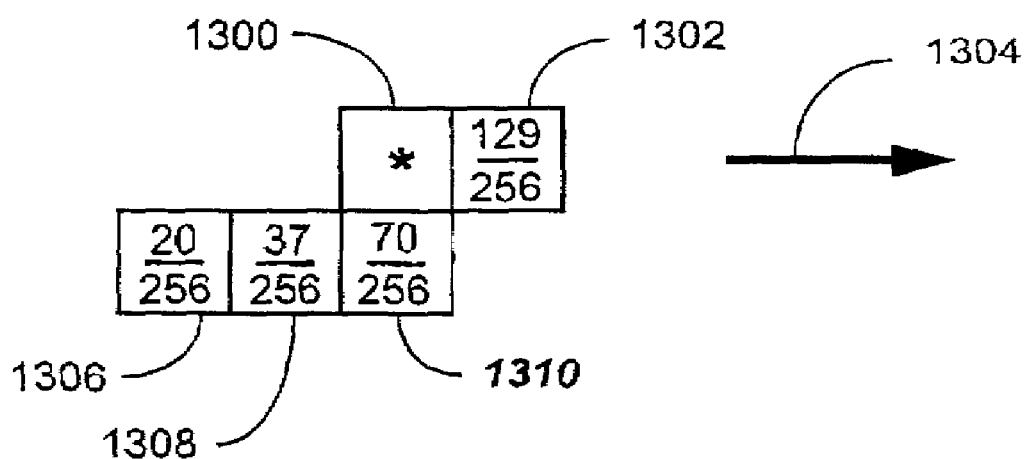
FIG. 16 depicts a prior art error diffusion arrangement.

FIG. 16 shows, by way of background, example error diffusion coefficients, where the current pixel is indicated by an asterisk. Error diffusion halftoning is performed by repeatedly processing a current pixel, and advancing the current pixel, pixel by pixel, scanline by scanline. Current pixel error is distributed to neighbouring unprocessed pixels shown in the diagram according to the fractions shown. That is, $129/256$ of a current pixel error is distributed to the next pixel on the same scanline; and the remainder of the current pixel error is distributed to 3 pixels on the following scanline. Note that the sum of the fractions adds to 1.

Figure 17:
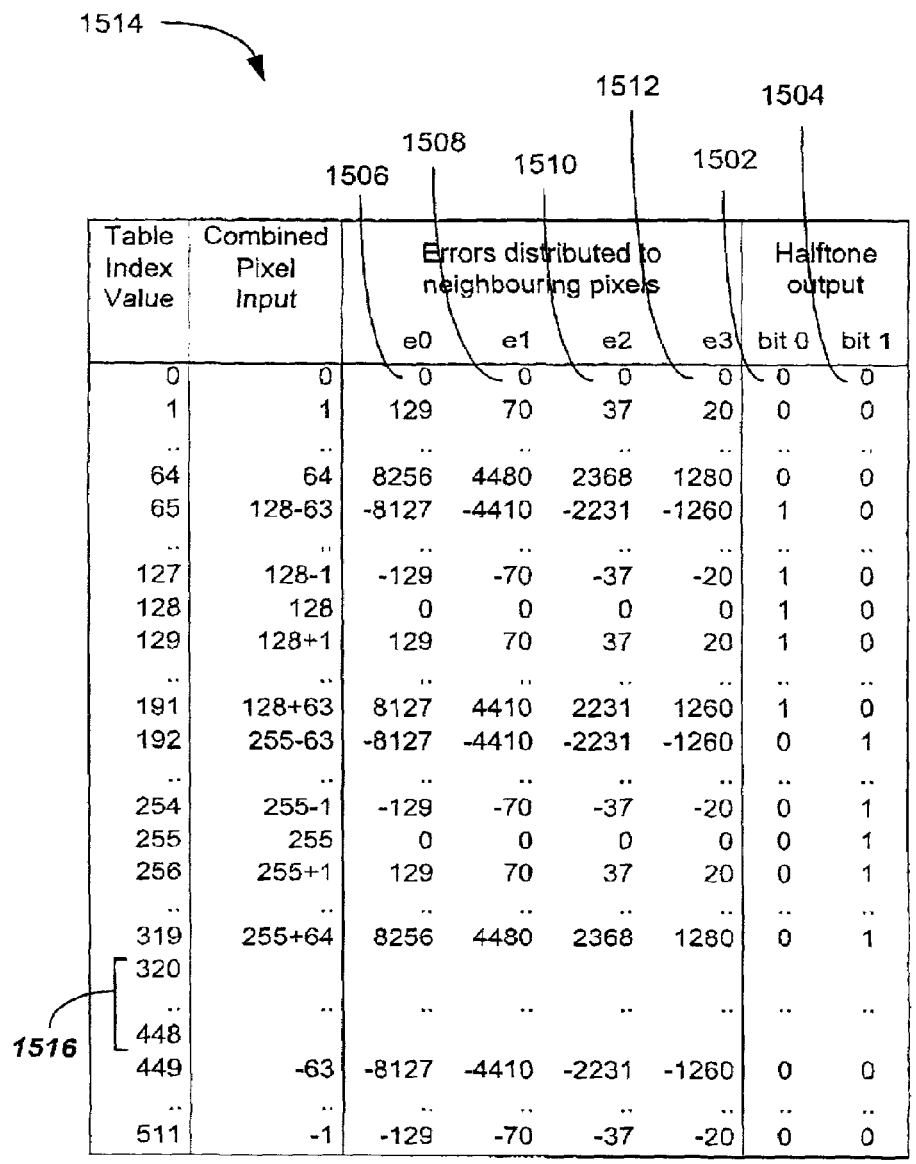
FIG. 17 shows an untuned 3 level halftone error diffusion table.

For each current pixel, a combined pixel input value is determined as the sum of the input image value, plus the error distributed to the current pixel. The combined pixel input value is used to index an error diffusion table 1514 in FIG. 17, or 1602 in FIG. 18, so as to determine (i) halftoned output eg. 1502, 1504 for the current pixel, and (ii) error values eg. 1506, . . . , 1512, to be distributed from the current pixel to neighbouring unprocessed pixels FIGS. 17 and 18 show error diffusion tables 1514, 1602 for 3 level halftone output suitable for use in printing super-intensity ink output. In the error diffusion tables 1602, 1514, errors to be distributed are shown as integer values equal to 256 times the fractional error value to be distributed. The tables have been prepared using the error diffusion coefficients of FIG. 16 and an algorithm described below. The algorithm can be used to prepare a table based on a chosen set of image values (eg. "0", "128", and "255", see FIG. 14) corresponding to halftone output values (eg. 0, 1, 2, see FIG. 14), thereby tuning the halftoning transfer function as previously described in relation to FIG. 14.

The error diffusion table of FIG. 17 has been prepared using image values of 0, 128, 255 corresponding to the 3 halftone output values of 0, 1 and 2 (representing, respectively, no dots, 1 dot, and two dots per output pixel position). This is equivalent to the arrangement depicted in graph 1424 in FIG. 14. In contrast, the error diffusion table of FIG. 18 has been prepared using image values of 0, 128, 191 corresponding to the 3 halftone output values, this being equivalent to the arrangement depicted in the graph 1426 in FIG. 14.

Because the image value corresponding to the maximum halftone output level is reduced for the table of FIG. 18 in relation to FIG. 17, use of the table of FIG. 18 results in greater use of the super output intensity ink deposition.

In both tables 1514, 1602, the halftone output 1604 is one of 3 values, each being a pattern of bit values for the 2 output bits: bit o0 (the least significant bit eg. 1606) and bit o1 (eg. 1608). The halftone output value 2 (bit o0=0; bit o1=1) corresponds to the super intensity ink deposition per pixel. Those rows in the tables which are not shown, but are indicated using a row of ellipsis ( . . . ) for example row 1610, can be inferred from the preceding row and succeeding row of the table. Both tables include a column 1612 for "combined pixel input", which is shown as a sum of (i) an image value, and (ii) an error value derived from the total error distributed to the current pixel. The table entries with table index value in the range 320 to 448 (ie. 1516, 1614) in the tables of FIGS. 17 and 18 are not used. These unused table entries are shown blank in FIGS. 17 and 18 and may be set to zero. The table entries e0, e1, e2, e3 ("errors distributed to neighbouring pixels" 1616–1618) with table index value in the range 255 to 319 in the table of FIG. 18 (ie. 1620) have been determined using clamped pixel error values. Error clamping is described below, as is an algorithm for preparation of an error diffusion table based on a chosen set of image values corresponding to the halftoned output levels, Step 1. For each image value, v, map the image value to the closest image value corresponding to a halftone output level, out[v]. If there is a halftone output image value above and below the image value which are equally close, choose the lower halftone output image value. From v and out[v] determine the error between them: err[v]=v−out[v]. Determine the minimum and maximum of these error values:

err_min=min$_{v \in 0 \ldots 225}$ err[v] and err_max=max$_{v \in 0 \ldots 255}$ err[v].

Step 2. For each error augmented image value, v_aug, equal to an image value plus an error in the range err_min to err_max, such that the error augmented image value is outside the range of image values, map the value to the closest image value corresponding to a halftone output level, v_out[v_aug]. Again, if there is a halftone output image value above and below the error augmented image value which are equally close, choose the lower halftone output image value. From v_aug and out[v_aug] determine the error between them: err[v_aug]=v_aug−out[v_aug]. Note that when the least image value corresponding to a halftone output level is greater than 0, or when the greatest image value corresponding to a halftone output level is less than 255, (as is the case for the table in FIG. 18) err[v_aug] may be outside the range err_min to err_max. From err[v_aug], err_min and err_max, determine a clamped error value representing the difference between v_aug and out[v_aug] but which is in the range err_min to err_max.

err_clamped[v_aug]=max(err_min, min(err_max, err [v_aug])).

Note that clamping error values ensures that during error diffusion processing, the error cannot build up without bound.

Step 3. Fill in the error diffusion table as follows. Firstly zero all entries in the table. For image values, v, the halftone output bit entries are determined as the halftone output level corresponding to the image value, out[v] and each of the errors distributed to neighbouring pixels is determined by multiplying err[v] by the appropriate error distribution coefficient, eg. FIG. 16. For error augmented image values, v_aug, outside the range of image values, the halftone output bit entries are determined as the halftone output level corresponding to the error augmented image value, out [v_aug] and each of the errors distributed to neighbouring pixels is determined by multiplying err_clamped[v_aug] by the appropriate error distribution coefficient, eg. FIG. 16.

Up to this point, the description has considered the case of a single blocked nozzle, having fully functional nozzles adjacent thereto. Furthermore, the defective nozzle has thus far been considered to be completely blocked, and the case of a partially functioning nozzle has not been addressed. Where there are two adjacent defective nozzles, compensation by means of either restricted, or full image value redistribution, as described by the previous C code, can result in the residual image value of the first defective nozzle being non-zero, even after compensation. This is because the image value of the first defective nozzle which remains after redistribution to the preceding nozzle cannot be redistributed to the succeeding second defective nozzle. In order to ensure that the image redistribution method provides a consistent result, the residual image value of a defective nozzle can be set to zero after defective nozzle compensation has been performed. This is particularly relevant when the defective nozzle is not, in fact, blocked but rather partially functional, producing a random type of output. Thus for example, such a defective nozzle can sometimes eject a relatively large ink droplet, and at other times can eject a relatively small ink droplet, both for the same input firing value. Setting the image value of such a defective nozzle to zero after image value redistribution has been performed ensures that any possible residual value remaining associated with the defective nozzle does not cause the nozzle to fire.

The description thus far has considered image value redistribution to immediately neighbouring nozzles, this being the most simple example to describe. In this type of compensation, surplus ink is deposited by the immediately neighbouring nozzles in order to compensate for the deficit, or lack of ink deposited by the defective nozzle. A more complex redistribution scheme involving, for example, first and second neighbouring pixels of a blocked nozzle can also be considered, where the expected benefits of such a scheme can justify the increase in complexity. Alternatively, use of head shading data prepared from printout generated by using defective nozzle compensation by image value redistribution to first neighbour nozzles can provide some compensation for the surplus local average ink deposition introduced for second neighbour nozzles.

Defective nozzle compensation by image value redistribution has thus far been described on the assumption that defective nozzle data consists of a 1 bit value for each nozzle, indicating a fully operational state, or alternatively, a fully defective state. Unwanted print artefacts can, in some cases, be further reduced by extending the defective nozzle data description to more than a binary description. In such an event, the degree to which image value is redistributed away from a defective nozzle can be controlled according to the finer granularity of the provided defective nozzle data.

The aforementioned description has been directed to defective nozzle compensation by image value redistribution in respect of fixed print head systems. Clearly, this can also be applied to shuttlehead print systems and the like. In respect of shuttlehead print systems, defective nozzle compensation by image value redistribution is particularly effective when the shuttle printer is performing "one pass" printing, since in that case dots of a colour component of a scanline are printed by only a single nozzle.

Figure 19:
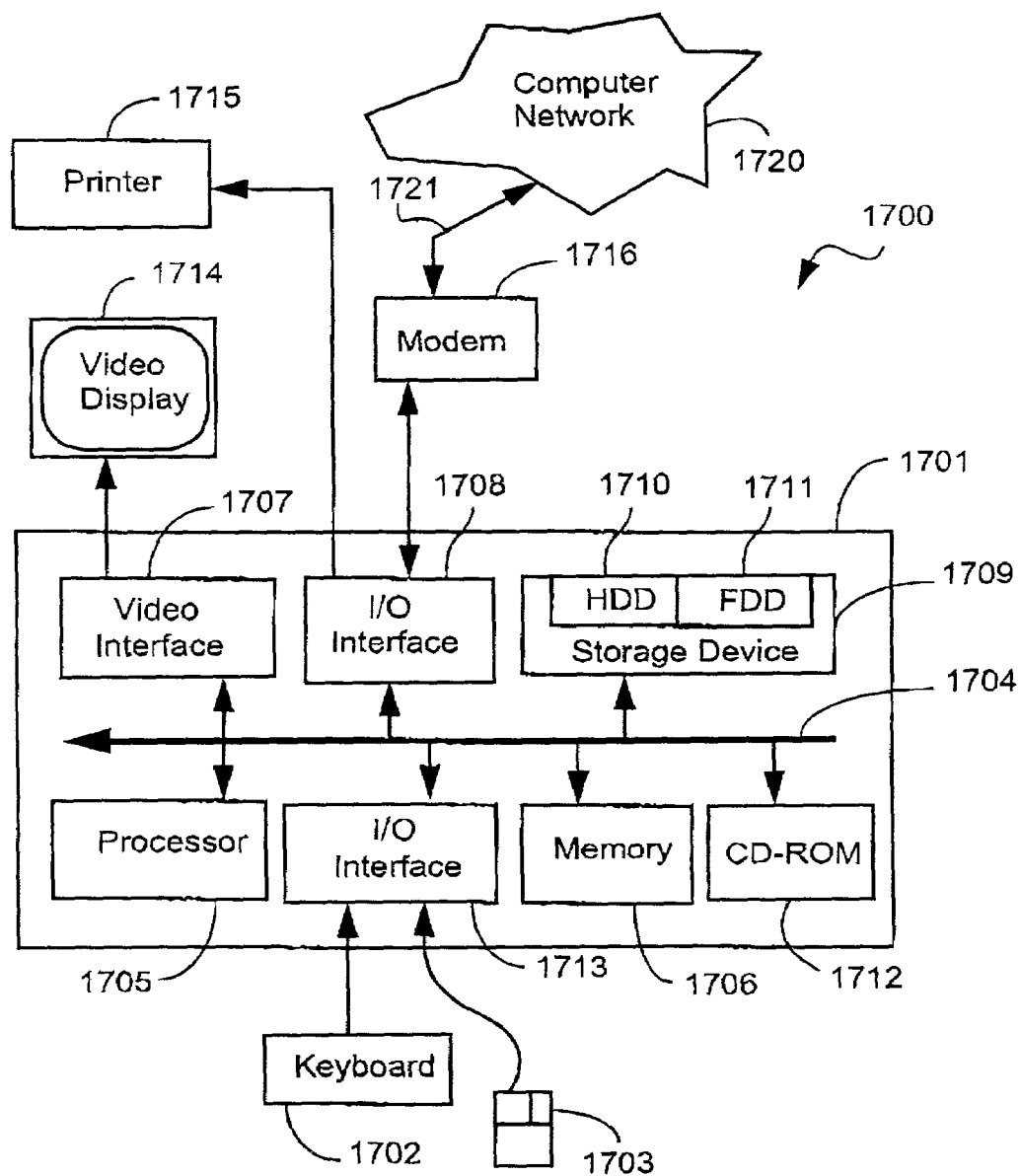
FIG. 19 depicts a general purpose computer upon which preferred embodiments of the invention can be practiced.

The method of compensating for a defective printer ink nozzle can be practiced using a conventional general-purpose computer system 1700, such as that shown in FIG. 19 wherein the processes of, for example, FIGS. 4, 10 and 13 can be implemented as software executing within the computer system 1700. In particular, the steps of the method of compensating for a defective printer ink nozzle are effected by instructions in the software that are carried out by the computer. The software can be divided into two separate parts, one part for carrying out the compensating for a defective printer ink nozzle, and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer effects an advantageous apparatus for compensating for defective print nozzles in accordance with the arrangements of the invention.

The computer system 1700 comprises a computer module 1701, input devices such as a keyboard 1702 and mouse 1703, output devices including a printer 1715 and a display device 1714. A Modulator-Demodulator (Modem) transceiver device 1716 is used by the computer module 1701 for communicating to and from a communications network 1720, for example connectable via a telephone line 1721 or other functional medium. The modem 1716 can be used to obtain access to the Internet, and other network systems, such as a Local Area Network (LAN) or a Wide Area Network (WAN).

The computer module 1701 typically includes at least one processor unit 1705, a memory unit 1706, for example formed from semiconductor random access memory (RAM) and read only memory (ROM), input/output (I/O) interfaces including a video interface 1707, and an I/O interface 1713 for the keyboard 1702 and mouse 1703 and optionally a joystick (not illustrated), and an interface 1708 for the modem 1716. A storage device 1709 is provided and typically includes a hard disk drive 1710 and a floppy disk drive 1711. A magnetic tape drive (not illustrated) can also be used. A CD-ROM drive 1712 is typically provided as a non-volatile source of data. The components 1705 to 1713 of the computer module 1701, typically communicate via an interconnected bus 1704 and in a manner which results in a conventional mode of operation of the computer system 1700 known to those in the relevant art. Examples of computers on which the embodiments can be practised include IBM-PC's and compatibles, Sun Sparcstations or alike computer systems evolved therefrom.

Typically, the program of the preferred embodiment is resident on the hard disk drive 1710 and read and controlled in its execution by the processor 1705. Intermediate storage of the program and any data fetched from the network 1720 can be accomplished using the semiconductor memory 1706, possibly in concert with the hard disk drive 1710. In some instances, the program can be supplied to the user encoded on a CD-ROM or floppy disk and read via the corresponding drive 1712 or 1711, or alternatively can be read by the user from the network 1720 via the modem device 1716. Still further, the software can also be loaded into the computer system 1700 from other computer readable medium including magnetic tape, a ROM or integrated circuit, a magneto-optical disk, a radio or infra-red transmission channel between the computer module 1701 and another device, a computer readable card such as a PCMCIA card, and the Internet and Intranets including email transmissions and information recorded on websites and the like. The foregoing is merely exemplary of relevant computer readable mediums. Other computer readable mediums can be practiced without departing from the scope and spirit of the invention.

Figure 20:
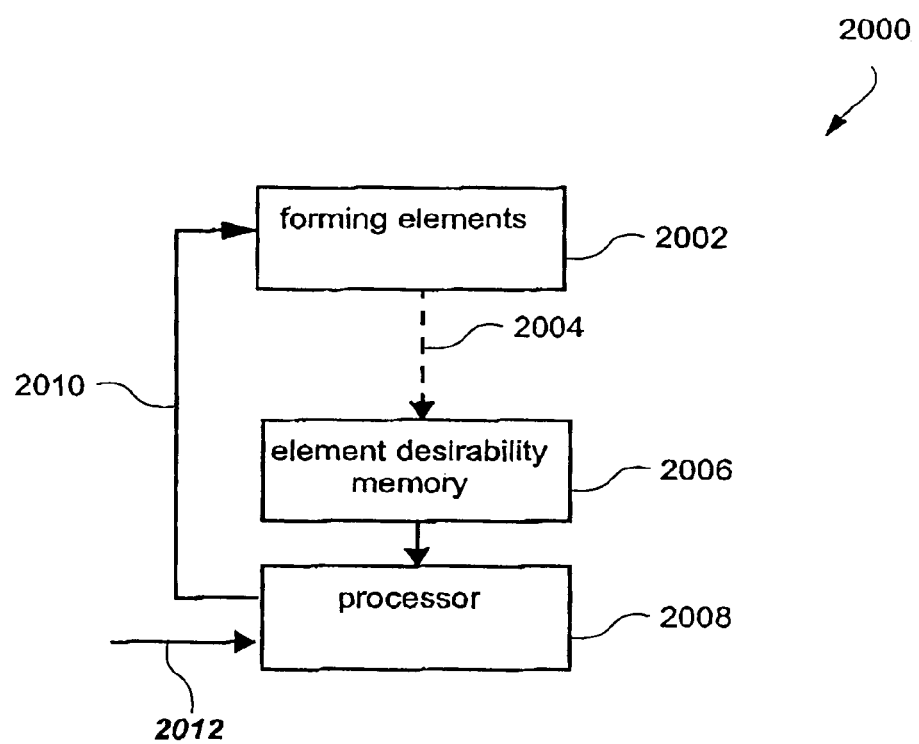
FIG. 20 depicts a block diagram representation of an apparatus for redistribution of image values from a defective nozzle to neighbouring non-defective nozzles

FIG. 20 depicts a block diagram representation 2000 of an apparatus for redistribution of image values from a defective nozzle to neighbouring non-defective nozzles. The apparatus 2000 has a number of image forming elements 2002, in respect of which, relative desirability data is stored, as depicted by a dashed line 2004, in a memory 2006. Input image values, depicted by an arrow 2012 are input into a processor 2008, as well as desirability data from the memory 2006. The processor 2008 consequently outputs biased image recording signal data, as depicted by an arrow 2010, to the forming elements 2002, which thereby form the desired image.

The method of compensating for a defective printer ink nozzle can alternatively be implemented in dedicated hardware such as one or more integrated circuits performing the functions or sub functions of compensating for a defective printer ink nozzle. Such dedicated hardware can include graphic processors, digital signal processors, or one or more microprocessors and associated memories.

INDUSTRIAL APPLICABILITY

It is apparent from the above, that the embodiments of the invention are applicable to the digital image printing industry. Image value redistribution provides an effective and computationally simple method of compensating for defective nozzles. Furthermore, this can be combined with existing unevenness correction methods. Restricted image value redistribution can be combined with cross-colour compensation for improved defective nozzle compensation. Full image value redistribution and super output intensity printing can be combined with checkerboard quantisation for ease of implementation, and can be used with modified error diffusion tables, in order to calibrate how often the super output intensity ink deposition per pixel is used.

The foregoing describes only some embodiments of the present invention, and modifications and/or changes can be made thereto without departing from the scope and spirit of the invention, the embodiments being illustrative and not restrictive.

The invention cliaimed is:

1. A method, in printing an image comprising a plurality of image values, of compensating for one or more defective printer nozzles in a plurality of printer nozzles, said method comprising the steps of:

biasing, for each first image value associated with a first nozzle, at least one second image value associated with another nozzle, said biasing being dependent upon said first image value and a printing desirability factor for said first nozzle;

halftoning said at least one biased second image value to form at least one corresponding nozzle firing value; and printing the image using said at least one nozzle firing value to thereby emulate the intended output of the first nozzle, thereby reducing print artefacts otherwise caused by the one or more defective nozzles, wherein said biasing further comprises the sub-steps of:

redistributing one of part of said first image value and all of said first image value to said at least one second image value associated with the other nozzle being an immediately neighboring nozzle of the same color; and increasing an image value associated with a corresponding nozzle of another color, said increase being dependent upon a residual image value of said first nozzle after said redistributing step.

2. A method of printing an image comprising a plurality of image values using a print head having a plurality of print nozzles wherein at least one print nozzle is defective, the method comprising the steps of:

tuning an error diffusion table to establish a relationship between the image values and corresponding average nozzle firing values dependent upon printing desirability factors of the print nozzles in the print head; and printing the multi-level halftoned image using the error diffusion table using the steps of:

biasing, for each first image value associated with said at least one defective nozzle, at least one second image value associated with another said nozzle, said biasing being dependent upon said first image value and a printing desirability factor for said at least one defective nozzle;

halftoning, using the tuned error diffusion table, said at least one biased second image value to form at least one corresponding nozzle firing value; and printing the image using said at least one nozzle firing value to thereby emulate the intended output of the at least one defective nozzle, thereby reducing print artefacts otherwise caused by the at least one defective nozzle.

3. An image recording apparatus for recording an image comprising a plurality of image values, the apparatus comprising:

a plurality of forming elements for forming the image using image recording signals;

memory means for storing data for said forming elements indicating the relative desirability of utilizing said forming elements for forming an image;

image processing means for redistributing said image values based on said data stored in said memory means so as to form redistributed image values the use of which biases use of said forming elements;

halftoning means for halftoning the redistributed image values to form corresponding said image recording signals; and image processing means for modifying said redistributed image values relating to a color component based on said redistributed image values and based on said data indicating the relative desirability of utilizing said forming elements relating to other color components, wherein said apparatus is a color image recording apparatus, said plurality of forming elements including plural groups of forming elements respectively corresponding to color components.

* * * * *

UNITED STATES PATENT AND TRADEMARK OFFICE
CERTIFICATE OF CORRECTION

| | |
|---|---|
| PATENT NO. | : 7,085,002 B2 |
| APPLICATION NO. | : 09/859437 |
| DATED | : August 1, 2006 |
| INVENTOR(S) | : Peter William Mitchell Ilbery et al. |

It is certified that error appears in the above-identified patent and that said Letters Patent is hereby corrected as shown below:

ON THE TITLE PAGE [56] REFERENCES CITED:

Foreign Patent Documents, "0664643 4/2000" should be deleted;
"1157840" should read --1 157 840--; and
"EP 01 30 4451 4/2003" should be deleted.

ON THE TITLE PAGE [75]:

Inventors, "James Robert Metcalfe, Killara NSW (AU)" should be deleted.

COLUMN 1:

Line 31, "delivery" should read --deliver--.

COLUMN 12:

Line 1, "two-old" should read --twofold--.

COLUMN 14:

Line 65, "err_min=min$_{v \in O\ 225}$ err[v]and" should read
--err_min=min$_{v \in O\ 225}$ err[v] and--.

COLUMN 15:

Line 6, "is a" should read --are--;
Line 7, "value" should read --values--; and
Line 21, "values" should read --value--.

UNITED STATES PATENT AND TRADEMARK OFFICE
CERTIFICATE OF CORRECTION

PATENT NO. : 7,085,002 B2
APPLICATION NO. : 09/859437
DATED : August 1, 2006
INVENTOR(S) : Peter William Mitchell Ilbery et al.

It is certified that error appears in the above-identified patent and that said Letters Patent is hereby corrected as shown below:

COLUMN 18:

Line 25, "artefacts" should read --artifacts--; and
Line 57, "arte-" should read --arti- --.

Signed and Sealed this

Twenty-sixth Day of August, 2008

JON W. DUDAS
*Director of the United States Patent and Trademark Office*